United States Patent Office 3,004,425
Patented Oct. 17, 1961

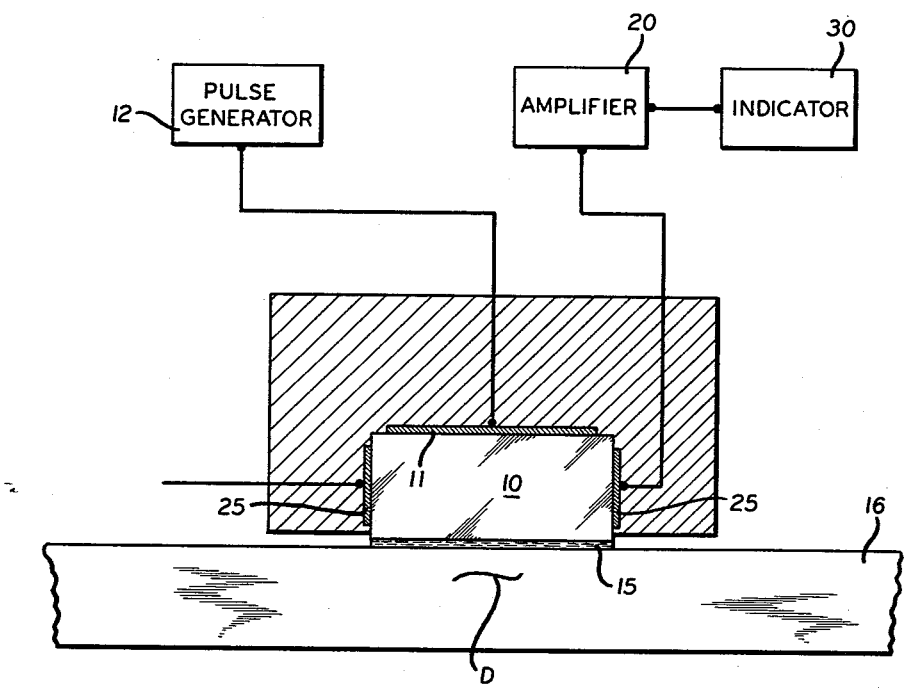

3,004,425
SIGNAL-TRANSMITTING AND RECEIVING SYSTEM
Elliott A. Henry, Newtown, Conn., assignor to Sperry Products, Inc., Danbury, Conn., a corporation of New York
Filed July 14, 1958, Ser. No. 748,476
5 Claims. (Cl. 73—67.8)

This invention relates to piezoelectric transducers, such as natural quartz, and particularly when utilized with instruments, such as the Ultrasonic Reflectoscope, which employ the pulse echo technique of ultrasonic materials inspection. In such systems an acoustic high frequency wave train is generated by the piezoelectric crystal by the application of a high frequency, high voltage, short duration electrical wave train or pulse across a pair of electrodes, on the piezoelectric crystal, one of which is acoustically coupled to the test specimen, through a suitable couplant. The acoustic wave train is coupled to the test specimen and propagates through it at a rate proportional to the velocity constant of the material. If the acoustic wave train encounters a change in acoustic impedance, such as a void or crack, a portion of the acoustic energy will be reflected back toward the source (transducer) and converted to electrical energy by the transducer, amplified and displayed by a suitable indicator.

Where the same piezoelectric element is employed both as a generator and detector of acoustic wave trains, the exciting electrical wave train that produces the initial acoustic wave train is also coupled to and energizes the echo amplifier. As the amplitude of the electrical wave is many hundred times the maximum amplifier input level, it is apparent that the amplifier will be blocked during and for an appreciable time after the initial pulse, during which time no echoes can be detected. This places a definite limitation on the minimum distance below the surface of the workpiece within which defects can be located.

It is therefore one of the principal objects of this invention to provide a single piezoelectric crystal acoustic transducer for generating and detecting short acoustic pulses or wave trains which will enable a test specimen to be inspected close to the entrant surface.

It is a further object to employ a single crystal transducer as specified above wherein an amplifier is utilized for amplifying the reflected pulses or wave trains from within the specimen but where said amplifier is not appreciably blocked by the initial electrical wave train or pulse.

Further objects and advantages of this invention will become apparent in the following detailed description thereof.

The accompanying drawing is an assembly view, largely diagrammatic, showing one embodiment of my invention.

Referring to the drawing there is disclosed an electro-acoustic transducer in the form of a piezoelectric element which may be a quartz crystal 10 having an electrode 11 applied thereto. The electrode 11 is connected to a pulse generator 12 adapted to generate high-frequency, high-voltage, short-duration electrical pulses which energize the crystal 10 in a direction between electrode 11 and the test specimen 16. These electrical pulses are converted into mechanical pulses by the piezoelectric quartz element 10 which then transmits these vibrations through a suitable couplant 15, into a workpiece or test specimen 16 which is to be inspected for defects D which may be a separation or lamination. Such defect will reflect the pulse back to the quartz crystal 10 which will then convert it into an electric voltage signal. Such signal after being suitably amplified by an amplifier 20 may be caused to operate an indicator 30 such as a cathode ray tube synchronized with the pulse generator.

It has been the practice heretofore to utilize the electrode 11 not only for generating the acoustic pulse but also for detecting the pulse reflection. This meant that an amplifier such as amplifier 20 would have to be connected to the electrode 11 and the pulse generator 12 and therefore would have impressed thereon the full force of the transmitted pulse voltage which may be as high as 1000 volts. A long blocking time therefore occurred in the amplifier during which the amplifier was ineffective to respond to pulse echoes. It was thus difficult to test close to the entering surface of the specimen because echoes from defects in this region returned to the electrode 11 while the amplifier was still blocked by the transmitted pulse.

Through the use of a signal transmitting and receiving system in accordance with the present invention it is possible to utilize a single crystal for sending pulses and receiving echoes without appreciably blocking the amplifiers. This is based upon the constant volume characteristic of a quartz crystal which has both an X-axis and a Y-axis and therefore applies equally well to an X-cut quartz crystal and to a Y-cut crystal. When a quartz crystal is subjected to a static field across one axis, for example, the X-axis faces, in such polarity as to cause a contraction along the X-axis, there is a corresponding expansion along the Y-axis, and the volume contraction in the X-axis plane is exactly equal to the volume expansion in the Y-axis plane. In other words, the volume of the crystal is constant but its geometry is changed. It also follows that the magnitude of the Y-axis face displacement with respect to the X-axis face displacement is proportional to the ratio of the X-axis face area to the Y-axis face area.

Therefore the crystal 10 is provided with electrodes on both the X-axis and Y-axis faces with electrical excitation along one axis and electrical voltages from echoes along the othere axis. Thus electrode 11 on the X-axis receives the high voltage excitation from the pulse generator 12 while a pair of electrodes 25 are connected to the crystal on its Y-axis. The electrodes 25, but not the electrode 11, are connected to the balanced input amplifier 20 whose output is connected to operate the indicator 30. With the electrode arrangement shown in the figure and the low dielectric constant of quartz, the electrostatic capacity between the two sets of electrodes is very low and therefore a negligible portion of the exciting pulse will be coupled to the electrodes 25. The amplifier 20 will therefore not be blocked by the exciting pulse. However, reflections of the pulse received from within the workpiece will act upon the crystal along the X-axis and therefore correspondingly along the Y-axis, so that the full sensitivity from the acoustic echoes will be applied to the receiving electrodes 25.

It will be apparent that, if desired, the pulse generator may be connected to electrodes 25 and the electrode 11 connected to the indicator, so that the transmitted pulse is applied to electrodes 25 while the reflections of the pulse from within the specimen are received by the electrode 11.

Having described my invention, what I claim and desire to secure by Letters Patent is:

1. A signal transmitting and receiving system for use in operative relation with a workpiece to be tested ultrasonically comprising: a single piezoelectric element having a surface adapted to be mechanically coupled with the workpiece and having a pair of intersecting axes; generator means for generating an electrical signal; means electrically coupled to opposed portions of said piezoelectric element intersected by one of said axes for applying said electrical signal to said piezoelectric element thereby to generate a mechanical signal emanating from said surface thereof for entering the workpiece; signal amplifier means electrically coupled to opposed portions of said piezoelectric element intersected by the other of said axes for deriving an electrical signal in response to a mechanical signal at said surface of said piezoelectric element representing a mechanical signal travelling through the workpiece, said signal amplifier means being electrically isolated from said generator means; and indicating means electrically coupled to said signal amplifier means.

2. A signal transmitting and receiving system for use in operative relation with a workpiece to be tested ultrasonically comprising: a single piezoelectric element having a surface adapted to be mechanically coupled with the workpiece and having a plurality of axes angularly disposed to each other and of fixed orientation relative to said surface; means for generating an electrical signal; means electrically coupled to opposed portions of said piezoelectric element intersected by one of said axes for applying said electrical signal to said piezoelectric element thereby to generate a mechanical signal emanating from said surface thereof for entering the workpiece; means electrically coupled to opposed portions of said piezoelectric element intersected by another of said axes for deriving an electrical signal in response to a mechanical signal at said surface of said piezoelectric element representing a mechanical signal travelling through the workpiece; and indicating means responsive to said electrical signal from said last-mentioned means.

3. A signal transmitting and receiving system for use in operative relation with a workpiece to be tested ultrasonically comprising: a single piezoelectric element having a surface adapted to be mechanically coupled with the workpiece and having a plurality of axes angularly disposed to each other and of fixed orientation relative to said surface; generator means for deriving an electrical pulse; means electrically coupled to opposed portions of said piezoelectric element intersected by one of said axes for applying said electrical pulse to said piezoelectric element thereby to generate a mechanical signal pulse emanating from said surface thereof for entering the workpiece; signal amplifier means electrically coupled to opposed portions of said piezoelectric element intersected by another of said axes for deriving an electrical pulse signal in response to a mechanical pulse signal at said surface of said piezoelectric element representing a mechanical pulse signal travelling through the workpiece, said signal amplifier means being electrically isolated from said generator means; and indicating means electrically coupled to said signal amplifier means.

4. A signal transmitting and receiving system for use in operative relation with a workpiece to be tested ultrasonically comprising: a single piezoelectric element having a surface adapted to be mechanically coupled with the workpiece and having X and Y axes angularly disposed to one another and of fixed orientation relative to said surface; means for generating an electrical signal; means electrically coupled to opposed portions of said piezoelectric element intersected by one of said X and Y axes for applying said electrical signal to said piezoelectric element thereby to generate a mechanical signal emanating from said surface thereof for entering the workpiece; means electrically coupled to opposed portions of said piezoelectric element intersected by the other of said X and Y axes for deriving an electrical signal in response to a mechanical signal at said surface of said piezoelectric element representing a mechanical signal travelling through the workpiece; and indicating means responsive to said electrical signal from said last-mentioned means.

5. A signal transmitting and receiving system for use in operative relation with a workpiece to be tested ultrasonically comprising: a single piezoelectric element having a surface adapted to be mechanically coupled with the workpiece and having X and Y axes angularly disposed to one another and of fixed angular orientation relative to said surface; generator means for generating an electrical pulse signal; means for electrically coupling said generator means to opposed portions of said piezoelectric element intersected by one of said X and Y axes for applying said electrical pulse signal to said piezoelectric element thereby to generate a mechanical pulse signal emanating from said surface thereof for entering the workpiece; amplifier means electrically coupled to opposed portions of said piezoelectric element intersected by the other of said X and Y axes for deriving a pulse electrical signal in response to a mechanical pulse signal at said surface of said piezoelectric element representing a mechanical pulse signal travelling through a workpiece, said amplifier means being electrically isolated from said generator means; and indicating means electrically coupled to said amplifier means.

References Cited in the file of this patent

UNITED STATES PATENTS

| | | |
|---|---|---|
| 1,907,427 | Marrison | May 9, 1933 |
| 2,387,472 | Sontheimer | Oct. 23, 1945 |
| 2,625,035 | Firestone | Jan. 13, 1953 |